(12) United States Patent
Yount

(10) Patent No.: US 6,389,551 B1
(45) Date of Patent: May 14, 2002

(54) METHOD OF PREVENTING FALSE OR UNNECESSARY FAILOVERS IN A HIGH AVAILABILITY CLUSTER BY USING A QUORUM SERVICE

(75) Inventor: Nelson H. Yount, Lexington, SC (US)

(73) Assignee: Steeleye Technology, Inc., Mountain View, CA (US)

( * ) Notice: Subject to any disclaimer, the term of this patent is extended or adjusted under 35 U.S.C. 154(b) by 0 days.

(21) Appl. No.: 09/213,206

(22) Filed: Dec. 17, 1998

(51) Int. Cl.[7] .................................................. G06F 11/00
(52) U.S. Cl. ......................................................... 714/4
(58) Field of Search ............................ 714/1, 4, 25, 43, 714/55

(56) References Cited

U.S. PATENT DOCUMENTS

| | | | |
|---|---|---|---|
| 4,710,926 A | 12/1987 | Brown et al. .................. | 371/9 |
| 4,754,398 A | 6/1988 | Pribnow | |
| 4,817,091 A | 3/1989 | Katzman et al. ............... | 371/9 |
| 4,847,837 A | 7/1989 | Morales et al. ................ | 371/8 |
| 4,933,940 A | 6/1990 | Walter et al. | |
| 5,383,178 A | 1/1995 | Unverrich | |
| 5,475,813 A | 12/1995 | Cieslak et al. ......... | 395/185.02 |
| 5,487,148 A | 1/1996 | Komori et al. ........ | 395/182.02 |
| 5,533,191 A | 7/1996 | Nakano .................. | 395/182.09 |
| 5,682,470 A | 10/1997 | Dwork et al. ............ | 395/182.1 |
| 5,892,895 A * | 4/1999 | Basavaiah ...................... | 714/4 |
| 5,909,540 A * | 6/1999 | Carter et al. ................... | 714/4 |
| 6,002,851 A * | 12/1999 | Basavaiah ...................... | 714/4 |
| 6,067,634 A * | 5/2000 | Nelson .......................... | 714/4 |
| 6,108,699 A * | 8/2000 | Moiin ........................ | 709/201 |
| 6,145,089 A * | 11/2000 | Le et al. ......................... | 714/4 |
| 6,148,410 A * | 11/2000 | Baskey et al. ................. | 714/4 |
| 6,237,113 B1 * | 5/2001 | Daiber ........................ | 712/29 |
| 6,253,335 B1 * | 6/2001 | Nakajima et al. ............. | 714/15 |
| 6,314,526 B1 * | 11/2001 | Arendt et al. ................. | 707/10 |
| 6,327,675 B1 * | 12/2001 | Burdett et al. ............... | 714/11 |
| 6,330,687 B1 * | 12/2001 | Griffith ........................ | 714/11 |
| 6,330,694 B1 * | 12/2001 | Hong et al. .................. | 370/401 |
| 6,332,202 B1 * | 12/2001 | Sheikh et al. ................. | 714/25 |

FOREIGN PATENT DOCUMENTS

JP          4-318721       *    4/1991

* cited by examiner

Primary Examiner—Robert Beausoleil
Assistant Examiner—Bryce P. Bonzo
(74) Attorney, Agent, or Firm—Nelson Mullins Riley & Scarborough

(57) ABSTRACT

A system and method of providing a quorum service which each system of a cluster registers with prior to a potential failover to insure proper functionality of the cluster is provided.

7 Claims, 3 Drawing Sheets

METHOD OF PREVENTING FALSE OR UNNECESSARY FAILOVERS IN A HIGH AVAILABILITY CLUSTER BY USING A QUORUM SERVICE

The present invention relates to a system and method for providing a quorum service for high availability clusters to prevent false or unnecessary failovers.

BACKGROUND OF THE INVENTION

Multi-processing systems are commonly configured in clusters of related systems to ensure high availability. These high availability clusters typically require the configuration of one or more heartbeats or communication paths between or among systems. A "heartbeat" is meant to include any type of brief, periodic communication signal which systems send to each other to insure that all systems in the cluster are functional. (Typically, a main system sends a message and the other systems repeat the message back to the main system to check system operability in the cluster.) The failure of all heartbeat mechanisms to a given system indicates that the system is dead (not functioning properly) and at least one of the remaining systems in the cluster needs to initiate a failover of any applications which were running on the affected system.

However, failed cables, failed routers, etc. can give the appearance that a system is not functioning properly when the system is actually still alive and functioning. Since the systems on one side of the network (i.e. one side of the failed cables) cannot communicate with the systems on the other side of the network, false failovers occur. This leads to the possibility of the same application being run on two or more different systems in the network, which can lead to data corruption. The possibility of the same application being run on two or more different systems in the network is especially high in cluster configurations in which there are no redundant heartbeat mechanisms, as well as in wide-area failover or disaster recovery configurations.

There is a need for a system and method which enables each system of a cluster to register with a quorum service which can assist in determining whether a failover is required.

SUMMARY OF THE INVENTION

In accordance with the teachings of the present invention, a system and method of providing a quorum service which each system of a cluster registers with prior to a potential failover to insure proper functionality of the cluster is provided. In particular, a method of preventing false or unnecessary failovers in a high availability cluster due to network failures, wherein said high availability cluster includes a plurality of systems, comprising the steps of providing a quorum service which each of said systems can independently communicate with; sending a registration signal from each system indicating that the system is operational when the failure of any system in the cluster is suspected; initiating shutdown procedures at a particular system if the particular system is unable to send a registration signal to said quorum service; requesting registration status by one or more of the systems other than the particular system that is unable to send a registration signal to said quorum service; and proceeding with failover activities by at least one of the systems other than the particular system that is unable to send a registration signal to said quorum service is provided.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE INVENTION

Figure 1:
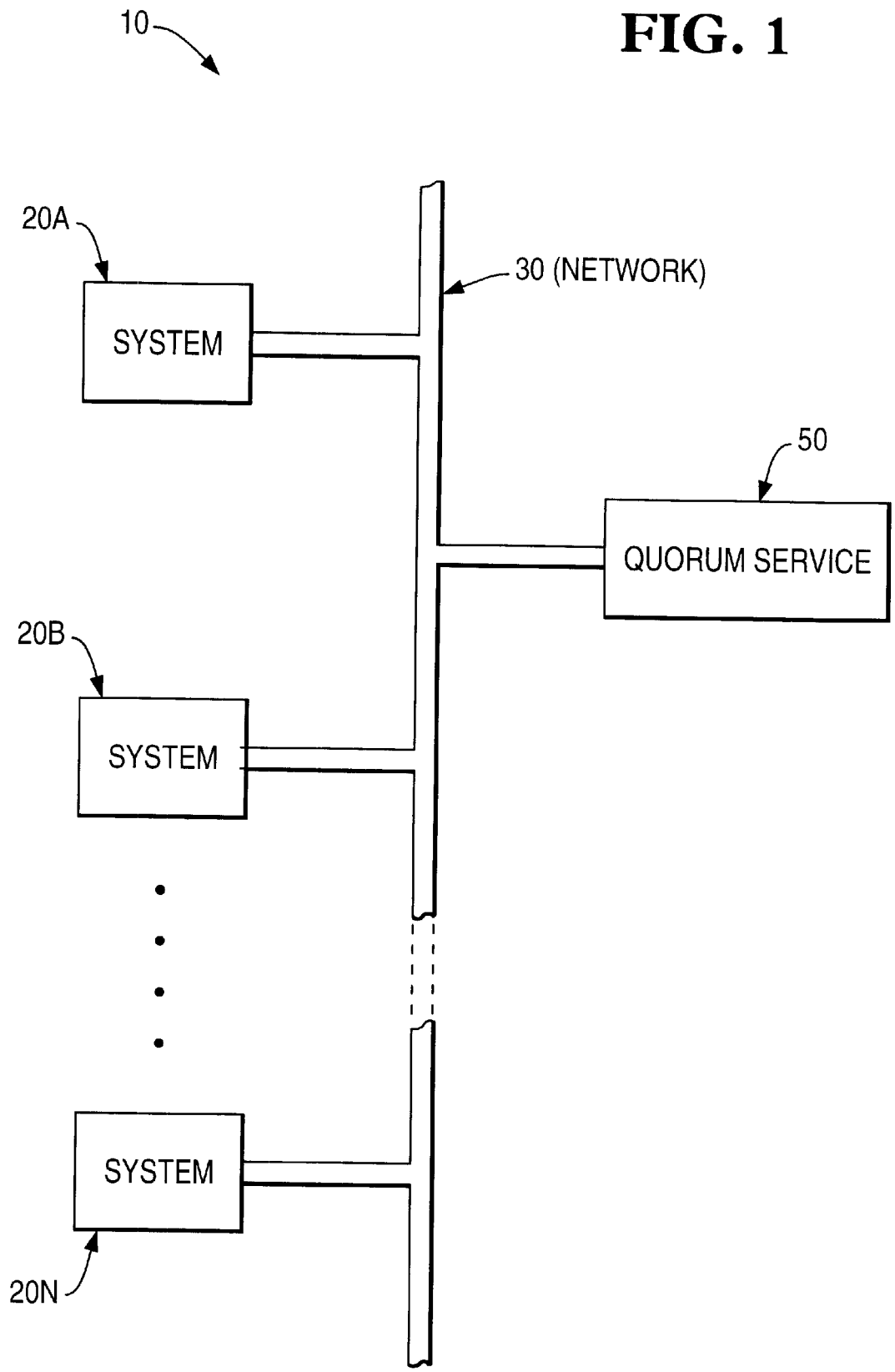
FIG. 1 is a block diagram of a cluster including the system and method of the present invention.

Referring now to the drawings, in which like-referenced characters indicate corresponding elements throughout the several views, attention is first drawn to FIG. 1 which shows a block diagram of the cluster 10 including a plurality of systems 20A, 20B, . . . 20N, a network 30 and a quorum service 50 which each system in a cluster registers with. Each system 20A, 20B, . . . 20N includes at least one processor and may include a plurality of processors. The network 30 may be any standard bus used to connect systems 20A, 20B, . . . 20N in a cluster 10.

The quorum service 50 is preferably implemented on a simple, standalone personal computer (PC), commonly available from IBM, Compaq, Dell, etc. and designated by the internal microprocessor such as 486 or Pentium as sold by Intel. The quorum service 50 is provided by the standalone personal computer through programming in any desired language (such as C) to implement the state machine in FIG. 3. Additionally, the quorum service 50 could be provided on an existing processor in the cluster 10, although the standalone PC implementation is preferred.

The quorum service 50 is accessible by all the systems via some type of network connection, such as network 30. This accessibility can occur from systems over TCP/IP (Transmission Control Protocol/Internet Protocol), as well as dial-up lines or any other type of network which allows the method of the present invention. Alternatively, quorum service 50 could be hardwired using dedicated components, ASICs (application specific integrated circuits), etc. ("blackbox" implementation) to provide the functionality of the state machine of FIG. 3.

Figure 2:
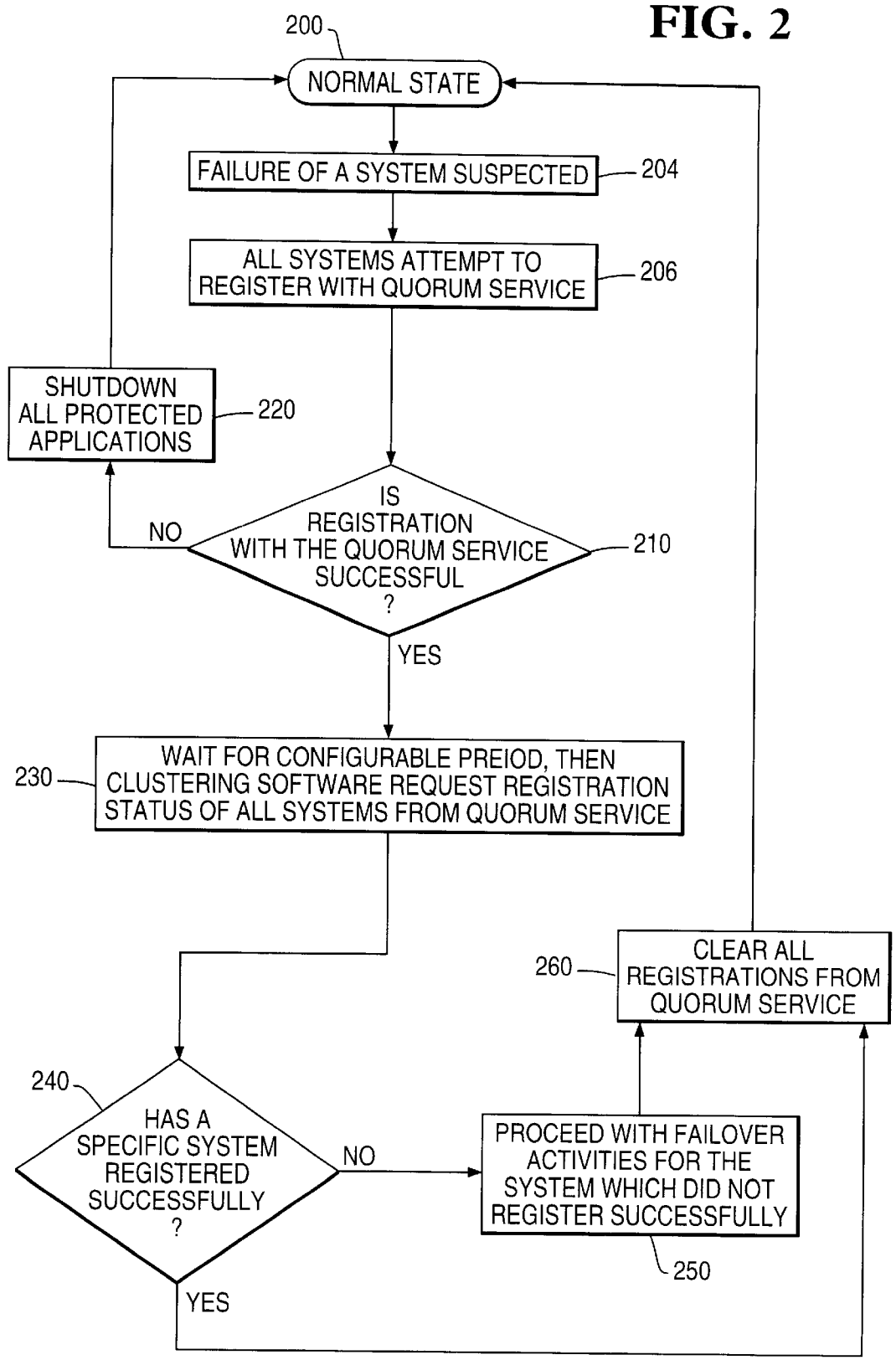
FIG. 2 is a flowchart of quorum service usage according to the method of the present invention.

Referring to FIG. 2, a flowchart of quorum service usage by clustering software within a cluster is provided. Initially, all systems of the cluster are in a Normal or Operational State 200. Whenever one system suspects that another system has failed, step 204, (such as when one system fails to receive a "heartbeat" from another system), each system 20A, 20B, . . . 20N attempts to register with the quorum service 50 in step 206 by sending a registration request message. If the suspected failed system is indeed still alive, it will have also noticed the loss of heartbeat, causing it to initiate the same registration sequence. Similarly, all other systems will notice a loss of heartbeat and all other systems will attempt to register with the quorum service 50. Then, in step 210, each system determines if registration with the quorum service 50 was successful. If it is desired to not rely on each system to independently determine when the system should register with the quorum service, the quorum service 50 may include the function of requesting registration of all other systems upon receiving a registration request from a first system.

If the attempted registration by a particular system fails, then in step 220, the effected system itself initiates shutdown procedures since it can't communicate with the quorum service 50. If the registration is successful, then in step 230, the clustering software waits for a configurable period, then the clustering software requests registration status of all systems from the quorum service 50. The configurable period is an administrator configurable time period designed to give all affected systems time to register with the quorum service 50. The configurable period should be as short as possible to avoid delaying legitimate failovers. This registration process with the quorum service 50 only occurs as needed when a system appears to have failed.

In step 240, the clustering software determines the registration status of all active systems. If the system which appears to have failed is indicated as "Not Registered", then the system requesting registration status proceeds with failover activities in step 250 as the Not Registered system is determined to be failed. This means that at least one other system in the network proceeds to run applications that were intended to be run on the Not Registered system. After the failover activities in step 250 are initiated, in step 260, the quorum service 50 is instructed to clear all registrations from the quorum service 50. (This step is built into typical clustering software after a system has completed the failover.) If, in step 240, all the systems 20A, 20B, 20N in the network are indicated as "Registered", then the quorum service 50 is instructed to clear all registrations from the quorum service 50 in step 260 and returns to the Normal State in step 200. Additionally, timing out of a predetermined period of time can clear all registrations in the quorum service 50.

This process of having the quorum service 50 indicate that a system is Not Registered insures that each individual system independently registers with the quorum service and as long as each system is able to communicate with the quorum service, no other system will initiate failover activities, even if some of the systems cannot communicate with each other, such as due to failed cables, failed router, etc.

Figure 3:
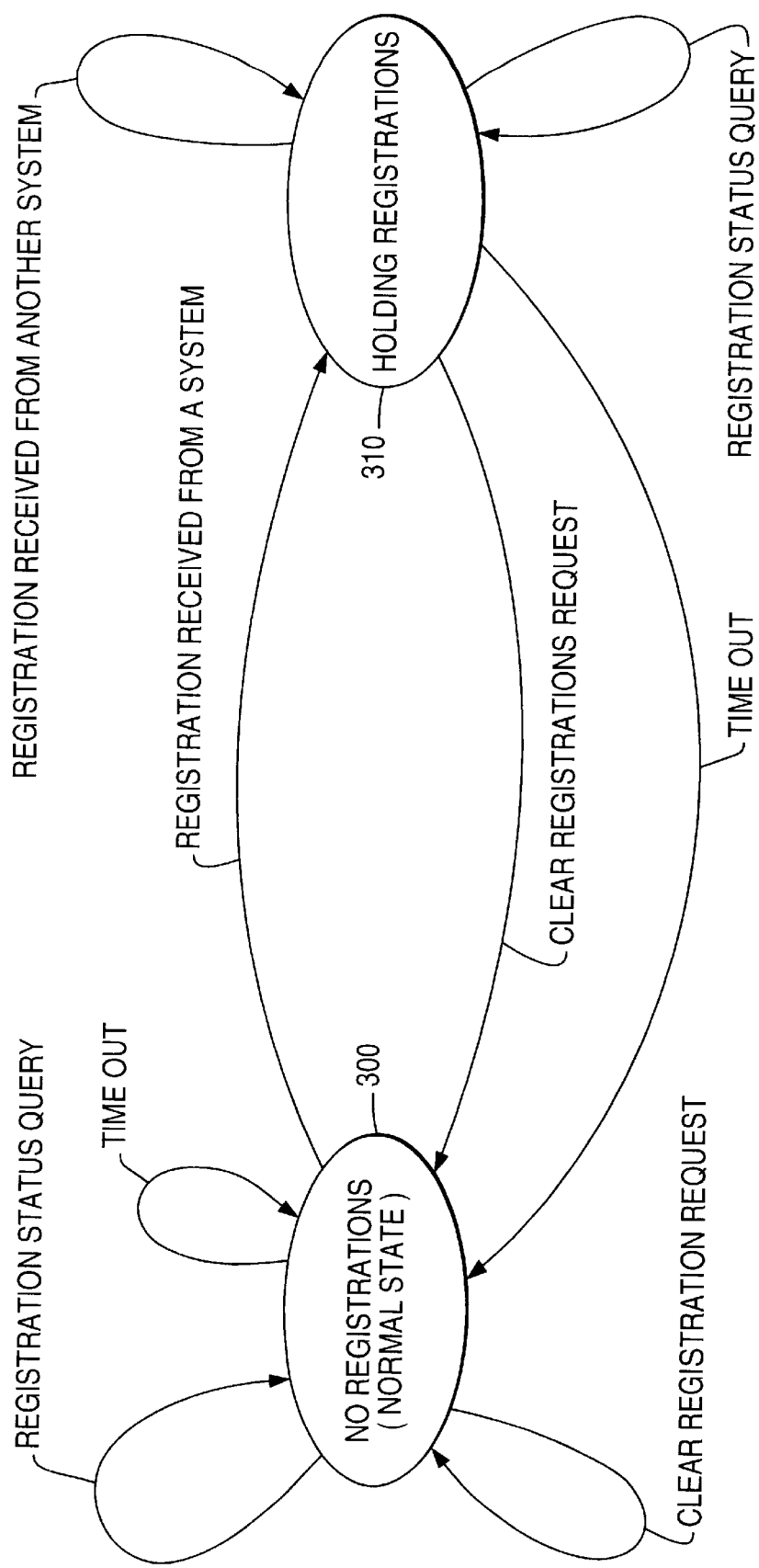
FIG. 3 is a state machine for the quorum service of the present invention.

In order to further understand the flowchart of FIG. 2, a state machine for the quorum service is provided in FIG. 3 and described in related Table 1.

TABLE 1

State Transition Table for quorum service.

| | STATES | |
|---|---|---|
| EVENTS | No registrations (Normal) | Holding registrations |
| I'm alive registration received. | Record registration, Set timeout timer; Move to "Holding registrations" state | Record registration, Reset timeout timer; No state change |
| Registration status query | Report "quorum service cleared" No state change. | Report Registrations. No state change. |
| Clear registrations request | No action. No state change. | Clear timeout timer. Clear registrations. Move to "No registrations" state. |
| Timeout | No action. No state change. | Clear registrations. Move to "No registrations" state. |

Basically, the quorum service has two states: No Registrations (Normal State) 300 and Holding Registrations 310. If the quorum service is in the No Registrations state 300, it will remain in that state until a registration is received from a system. Then the quorum service moves to the Holding Registration state 310 until either a Clear Registrations Request or a Timeout occurs. Any of the systems can send the Clear Registrations Request. The timeout mechanism is a part of the quorum service itself. As indicated above, this state machine can be implemented using either hardware or software, dedicated or generic, and any such implementation is intended to be included within the scope of this invention.

The term "quorum service" indicates a service used to resolve issues of ownership of a common computing resource, or to assist in making a procedural decision, when there are two or more equal and disagreeing parties (typically systems in a computer network) involved.

The quorum service of the present invention prevents false failovers by insuring that no failover occurs if the system which appears to have failed is actually still alive and can register with the quorum service. In the event that a system is unable to connect and register with the quorum service, the cluster software is configured such that the unable-to-register system will then disable all of its protected applications, so that they can be properly recovered by those systems which were able to register with the quorum service.

Although the invention has been described with particular reference to certain preferred embodiments thereof, variations and modifications of the present invention can be effected within the spirit and scope of the following claims.

What is claimed is:

1. A method of preventing false or necessary failovers due to network failures in a high availability cluster including a plurality of systems communicating via a network communication path, comprising the steps of:

providing an independent quorum service which each of said systems can communicate with independently of said network communication path;

after failure of a particular system in said cluster is suspected due to failure of a periodic heartbeat communication signal sent along said network communication path, sending a registration signal to said quorum service from other systems indicating that such other systems are operational;

initiating shutdown procedures at said particular system if said particular system is unable to send a registration signal to said quorum service; and proceeding with failover activities by at least one of the systems other than said particular system that is unable to send a registration signal to said quorum service so as to proceed to run at least one application otherwise intended to be run on said particular system.

2. The method of claim 1 wherein the step of requesting registration status occurs after a configurable period of time.

3. The method of claim 1 wherein each of said plurality of systems includes at least one processor.

4. The method of claim 1 wherein said quorum service includes a standalone personal computer.

5. A method of preventing false or unnecessary failovers in a high availability cluster due to network failures, wherein said high availability cluster includes a plurality of systems, comprising the steps of:

providing a quorum service which each of said systems can independently communicate with;

sending a registration signal from each system indicating that the system is operational when the failure of any system in the cluster is suspected;

initiating shutdown procedures at a particular system if said particular system is unable to send a registration signal to said quorum service;

requesting registration status by one of the systems other than said particular system that is unable to send a registration signal to said quorum service;

proceeding with failover activities by at least one of the systems other than said particular system that is unable to send a registration signal to said quorum service; and clearing all registrations from the quorum service.

6. A system for preventing false or unnecessary failovers due to network failures in a high availability cluster, comprising:

a plurality of systems running applications, each of said systems defining a respective node in said high availability cluster, a quorum service distinct from said nodes in said high availability cluster;

means for connecting each of said plurality of systems to said quorum service such that said plurality of systems can communicate with said quorum service even in the event of said network failures;

wherein each of said plurality of systems sends a registration signal to said quorum service or initiates shutdown procedures if a particular system is unable to send a registration signal and wherein failover activities are initiated by at least one other system if said particular system is unable to send a registration signal to said quorum service.

7. A system for preventing false or unnecessary failovers due to network failures in a high availability cluster, wherein said high availability cluster includes a plurality of systems defining respective nodes thereof, comprising:

means for providing a quorum service distinct from said nodes in said high availability cluster such that each of said systems can independently communicate with said quorum service even in the event of said network failures;

means for sending a registration signal from each system indicating that the system is operational when the failure of any system in the cluster is suspected;

means for initiating shutdown procedures at a particular system if the particular system is unable to send a registration signal to said quorum service;

means for requesting registration status by one of the systems others than the particular system that is unable to send a registration signal to said quorum service; and means for proceeding with failover activities by at least one of the systems other than the particular system that is unable to send a registration signal to said quorum service.

* * * * *